G. LEVE.

Assignor, by mesne assignments, to A. B. HARRIS.

SLEEPING CAR.

No. 10,703. Reissued Mar. 30, 1886.

Witnesses:
W. F. Rice
Henry A. Chapin

Inventor:
Gustave Leve
By Henry A. Chapin
Atty

N. PETERS, Photo-Lithographer, Washington, D. C.

UNITED STATES PATENT OFFICE.

GUSTAVE LEVE, OF NEW YORK, N. Y., ASSIGNOR, BY MESNE ASSIGNMENTS, TO AZARIAH B. HARRIS, OF SPRINGFIELD, MASSACHUSETTS.

SLEEPING-CAR.

SPECIFICATION forming part of Reissued Letters Patent No. 10,703, dated March 30, 1886.

Original No. 181,857, dated September 5, 1876; Reissue No. 9,688, dated May 3, 1881. Application for reissue filed February 16, 1886. Serial No. 192,142.

*To all whom it may concern:*

Be it known that I, GUSTAVE LEVE, of New York, N. Y., have invented a new and useful Improvement in Sleeping-Cars, of which the following is a specification.

Figure 1:
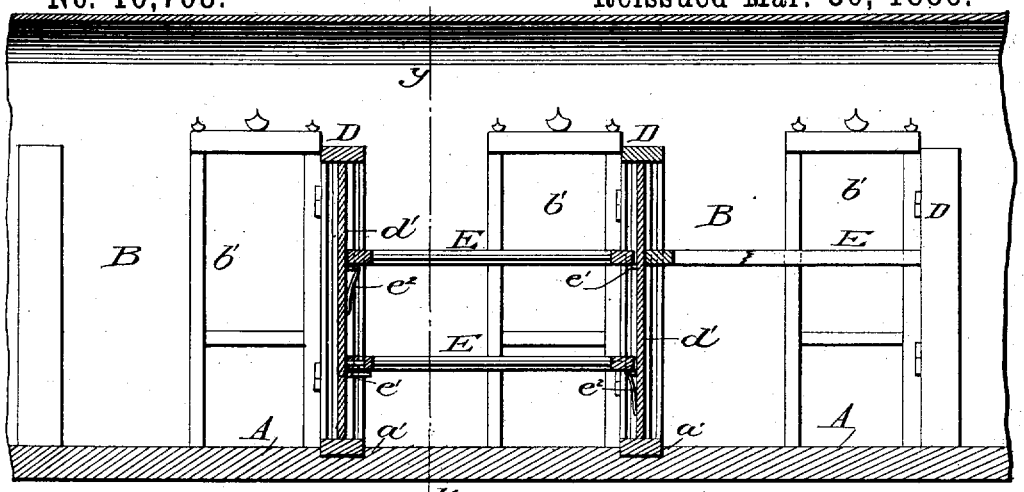
Figure 2:
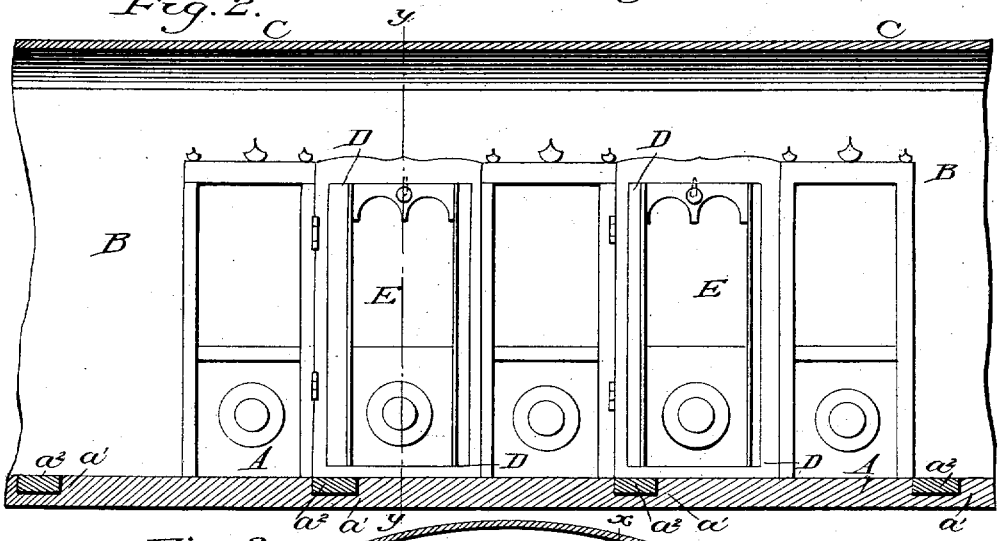
Figure 3:
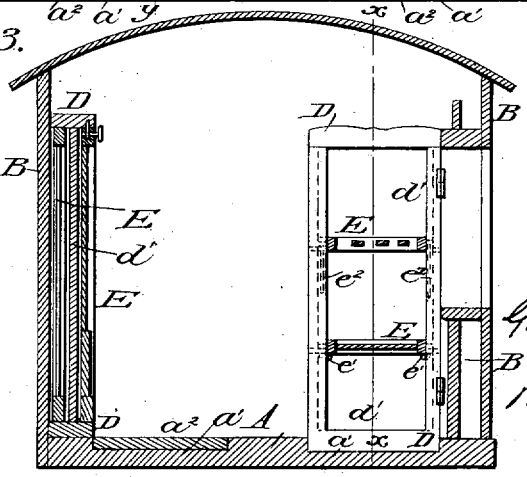

Figure 1 is a detail longitudinal section of a part of a car to which my improvement has been applied, taken through the line $x\,x$, Fig. 3, showing some of the berths arranged for use. Fig. 2 is the same view as Fig. 1, but showing the berths closed up. Fig. 3 is a cross-section of the same, taken through the line $y\,y$, Figs. 1 and 2.

Similar letters of reference indicate corresponding parts.

The object of this invention is to furnish railroad-cars with berths so constructed and arranged that they may be folded up out of the way in preparing the car for day use, and will not interfere with the ordinary use of the car.

The invention consists in the frames divided into two compartments by a central partition, and hinged to the side walls of a car in such a way that they may be swung in against the said walls or swung out at right angles with them; in the combination, with the hinged frames, of the berths, the stop-pins, and the spring-stops in such a way that the said berths may be placed in a vertical position within said frames or turned down into a horizontal position between two adjacent frames, and in a car-floor provided with recesses at right angles with the side walls to receive the lower ends of the hinged frames when said frames are swung outward, as hereinafter fully described.

A represents the floor, B the side walls, and C the roof, of a car, about the construction of which parts there is nothing new.

$b'$ are the windows, which are formed in the side walls, B, in the usual way, and in the spaces between which are hinged frames D, in such a way that they may be turned in against the wall, so as to be entirely out of the way, as shown in Fig. 2 and at the left side of Fig. 3, and may be turned out at right angles, as shown in Fig. 1 and at the right side of Fig. 3. The hinges of the frames D are formed with long pintles, as shown in Fig. 2, so that when turned out the lower ends of said frames may be dropped into recesses $a'$, formed in the floor A to receive them, which recesses, when the frames D are turned in against the wall B, are closed by blocks $a^2$, fitted into them, as shown in Figs. 1, 2, and 3.

The frames D are divided into two compartments by a central plate, $d'$, and into each of these compartments is fitted a berth, E. To the side edges of one end of each berth E are attached pins, which enter longitudinal grooves in the inner surfaces of the side bars of the frames D, so that by moving the upper end of each berth outward it may be slid upward and turned down into a horizontal position, its free end entering the adjacent frame D and resting upon stop-pins $e'$, attached to said frame.

The pivoted ends of the berths E rest upon spring-stops $e^2$, attached to said frames D, and which are so formed as to yield and allow said frame to be slid up and down when adjusting it into either position. In this way two berths are formed between each two frames D, as shown in Figs. 1 and 3.

The bottoms of the berths E, that are outward when the frames D are turned in against the walls B, are paneled to represent a portion of the walls of the car, as indicated in Fig. 2.

Having thus described my invention, I claim as new and desire to secure by Letters Patent—

1. The frames D, divided into two compartments by a central partition, $d'$, and hinged to the side walls, B, of a car in such a way that they may be swung in against the said walls or swung out at right angles with them, substantially as herein shown and described.

2. The combination, with the hinged frames D, of the berths E, the stop-pins $e'$, and the spring-stops $e^2$, in such a way that the said berths may be placed in a vertical position within said frames D or turned down into a horizontal position between two adjacent frames D, substantially as herein shown and described.

3. A car-floor provided with recesses $a'$ at right angles with the walls B, to receive the lower ends of the frames D when said frames are swung outward, substantially as herein shown and described.

Witnesses: GUSTAVE LEVE.
R. LEE ALEXANDER,
A. F. HIGGS.